(12) United States Patent
Kalyana et al.

(10) Patent No.: US 10,014,927 B2
(45) Date of Patent: Jul. 3, 2018

(54) PARALLEL ROUTE RESERVATION FOR WIRELESS TECHNOLOGIES

(71) Applicant: International Business Machines Corporation, Armonk, NY (US)

(72) Inventors: Shankar S. Kalyana, Austin, TX (US); Jigneshkumar K. Karia, Maharashtra (IN); Seetharaman S. Ramasubramanian, Lower Hutt (NZ); Gandhi Sivakumar, Bentleigh (AU); Poornima R. Venkatarao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 14/674,759

(22) Filed: Mar. 31, 2015

(65) Prior Publication Data

US 2016/0294468 A1 Oct. 6, 2016

(51) Int. Cl.
*H04B 7/185* (2006.01)
*H04L 12/24* (2006.01)
(Continued)

(52) U.S. Cl.
CPC ......... *H04B 7/185* (2013.01); *H04L 41/5003* (2013.01); *H04L 45/00* (2013.01);
(Continued)

(58) Field of Classification Search
CPC .... H04B 7/185; H04W 74/08; H04W 76/021; H04W 76/026; H04L 41/5003
See application file for complete search history.

(56) References Cited

U.S. PATENT DOCUMENTS 7,848,765 B2  12/2010  Phillips et al.
8,023,456 B2   9/2011  Isokangas
(Continued)

FOREIGN PATENT DOCUMENTS

EP  1832045 B1  1/2013
WO 2012109269 A1  8/2012

OTHER PUBLICATIONS

"Business Models for Implementing Geospatial Technologies in Transportation Decision-Making"; The Volpe Center; pp. 1-37; Prepared for Office of Interstate and Border Planning Federal Highway Administration U.S. Department of Transportation; Prepared by Planning and Policy Analysis Division John A. Volpe National Transportation Systems Center Research and Innovative Technology Administration U.S. Department of Transportation.

(Continued)

*Primary Examiner* — Robert M Morlan
*Assistant Examiner* — Pamit Kaur
(74) *Attorney, Agent, or Firm* — Alexander G. Jochym

(57) ABSTRACT

A communication request between a first computer and a second computer is received. At least two network resources in a communication path between the first computer and the second computer are determined. At least one satellite that is in communication with each of the at least two network resources in the communication path is identified, wherein the identified at least one satellite notifies each of the at least two network resources in the communication path of the communication request. Responsive to notifying the at least two network resources of the communication request, the communication request between the first computer and the second computer is initiated.

18 Claims, 3 Drawing Sheets

(51) Int. Cl.
*H04W 74/08* (2009.01)
*H04L 12/701* (2013.01)
*H04W 76/16* (2018.01)
*H04W 76/11* (2018.01)
*H04W 84/04* (2009.01)

(52) U.S. Cl.
CPC ............ *H04W 74/08* (2013.01); *H04W 76/11* (2018.02); *H04W 76/16* (2018.02); *H04W 84/042* (2013.01)

(56) References Cited

U.S. PATENT DOCUMENTS

| | | | |
|---|---|---|---|
| 8,111,705 | B1 | 2/2012 | Bartlett et al. |
| 8,126,445 | B2 | 2/2012 | Kennedy |
| 8,385,964 | B2 | 2/2013 | Haney |
| 8,407,220 | B2 | 3/2013 | Fitzpatrick et al. |
| 8,594,684 | B2 | 11/2013 | Miller et al. |
| 9,474,053 | B2 | 10/2016 | Kulal et al. |
| 2008/0130627 | A1 | 6/2008 | Chen et al. |
| 2010/0098096 | A1 | 4/2010 | Yang |
| 2011/0053628 | A1* | 3/2011 | Kim ............... H04B 7/18539 455/509 |
| 2012/0027025 | A1 | 2/2012 | Bekiares et al. |
| 2012/0039262 | A1 | 2/2012 | Walsh |
| 2013/0322413 | A1 | 12/2013 | Pelletier et al. |
| 2015/0071212 | A1 | 3/2015 | Kim et al. |

OTHER PUBLICATIONS

"QoS-Aware Scheme for Mobility Management and Adaptive Resource Reservation in 4G Wireless Networks"; IGI Global Disseminator of Knowledge; <http://www.igi-global.comichapter/qos-aware-scheme-mobility-ma . . . >.

Faucheur, et al.; Resource Reservation Protocol (RSVP) Extensions for Path-Triggered RSVP Receiver Proxy (RFC5946); IP.com Prior Art Database Technical Disclosure; IP.com 000200408; Original Publication Date Oct. 1, 2010; pp. 1-36; Electronic Publication Oct. 11, 2010.

Tarique, et al.; "Survey of Multipath Routing Protocols for Mobile Ad Hoc Networks"; Journal of Network and Computer Applications 32; 2009; pp. 1125-1143; Copyright 2009 Elsevier Ltd.

Yao, Hui-Juan, et al.; "Dynamic Point Forwarding Scheme for QoS-aware Mobility in Future All-IP Wireless Networks"; pp. 1073-1077; Copyright 2006 IEEE.

Kubinidze, Nino, et al.; "Intersystem End-to-End QoS Provision in 4G Heterogeneous Networks"; pp. 1-6; Department of Electronic and Computer Engineering; University of Limerick; Ireland.

Rajes, S. Arun, et al.; "Routing Optimization Performance on Ad-Hoc Network: Distributed Approach Using 4G Devices"; International Journal of Electronics and Computer Science Engineering; IJECSE; vol. 2; No. 1; pp. 263-272.

Cidon, Israel, et al.; "Analysis of Multi-Path Routing"; pp. 1-13.

Ma, Qingming, et al.; "Quality-of-Service Routing for Traffic with Performance Guarantees"; Computer Science Department; pp. 1-12; Carnegie Mellon University; Pittsburgh, PA; Copyright IFIP 1997; Published by Chapman & Hall.

Chen, Shigang, et al.; "Distributed Quality-of-Service Routing in High-Speed Networks Based on Selective Probing"; pp. 1-10; Department of Computer Science; University of Illinois at Urbana-Champaign; Urbana, IL.

Gustavo Joao Alves Marques Carneiro; "QoS Abstraction layer in 4G Access Networks"; Departmento de Engenharia electrotecnica e de Computadores; Nov. 2005; pp. 1-136.

Belhoul, Ahmad; "Quality of Service (QoS) Provisioning Mechanisms in Fourth Generation (4G) Wireless All-IP Networks"; Thesis Submitted to the Department of Electrical and Computer Systems Engineering; Monash University; Australia; pp. 1-176; Dec. 2007.

* cited by examiner

PARALLEL ROUTE RESERVATION FOR WIRELESS TECHNOLOGIES

BACKGROUND

The present invention relates generally to the field of wireless technologies, and more particularly to parallel route reservation for wireless technologies.

Wireless communication is the transfer of information between two or more points that are not connected by an electric conductor. The most common wireless technologies use radio. For example, a cellular network or mobile network is a wireless network distributed over land areas called cells, each served by at least one fixed-location transceiver, known as a cell site or base station. In a cellular network, each cell uses a different set of frequencies from neighboring cells to avoid interference and provide guaranteed bandwidth within each cell. When joined together, these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

A wireless ad hoc network (WANET) is a centralized type of wireless network. The network is ad hoc because it does not rely on a pre-existing infrastructure, such as routers in wired network or access points in managed wireless networks. Instead, each node participates in routing by forwarding data for other nodes, so the determination of which nodes to forward data is made dynamically on the basis of network connectivity. An ad hoc network typically refers to any set of networks where all devices have equal status and are free to associate with any other ad hoc network device in link range.

SUMMARY

Embodiments of the present invention include a method, computer program product, and system for parallel route reservation for wireless technologies. In one embodiment, a communication request between a first computer and a second computer is received. At least two network resources in a communication path between the first computer and the second computer are determined. At least one satellite that is in communication with each of the at least two network resources in the communication path is identified, wherein the identified at least one satellite notifies each of the at least two network resources in the communication path of the communication request. Responsive to notifying the at least two network resources of the communication request, the communication request between the first computer and the second computer is initiated.

DETAILED DESCRIPTION

Embodiments of the present invention provide a program that provides parallel route reservation for wireless technologies. Embodiments of the present invention provide for importing a network layout (controllers) including the bearer-based control units in each network. Bearer-based control units are logical channels between controllers to specify predefined bandwidths for services. Each controller, i.e., an entity that manages and allocates resources of network elements, is fitted with an extended hardware unit to communicate with a satellite. A piece of data is requested to be transmitted from a source location to a destination location. The Mobility Management Entity (MME) determines the bearer channels in the network that will handle the transmission request and the sprayer program is notified. The sprayer program notifies a satellite of the bearer channels and the satellite notifies the appropriate controllers based on the bearer channels to enable route reservation for the transmission request. When the route reservation is confirmed, the transmission is initiated.

Embodiments of the present invention recognize that Fourth Generation (4G) technologies are focused on providing higher bandwidth. In an alternative embodiment, the present invention is compatible with all legacy networks (e.g., Third Generation (3G), etc.) Additionally, services delivered using 4G access technologies demand increased speed. Currently, there are route reservation protocols that are serial in nature. In other words, reservations for transferring data between locations in a route occur as the data gets to the location. In other words, if data is transferred from a source to a destination via A1, A2, and A3, then the source must reserve a route to A1 and once the data is transferred to A1, then A1 must reserve a route to A2, etc. Parallel route reservation reserves a route between the source, A1, A2, A3, and the destination at the same time.

Parallel route reservation leads to less latency in terms of transferring packets from a source to a destination since the number of hops (i.e., route reservation requests) are less compared to serial route reservations. Parallel route reservation also means that the quality of service for transferring high priority packets can be better because all of the resources needed for the transmission are reserved at the same time unlike serial route reservation where one of the resources needed may not be available for reservation and alternate arrangements may need to be made. Also, in the case of parallel route reservation, the time taken to complete the transfer of data would be much less as compared to serial route reservation.

Figure 1:
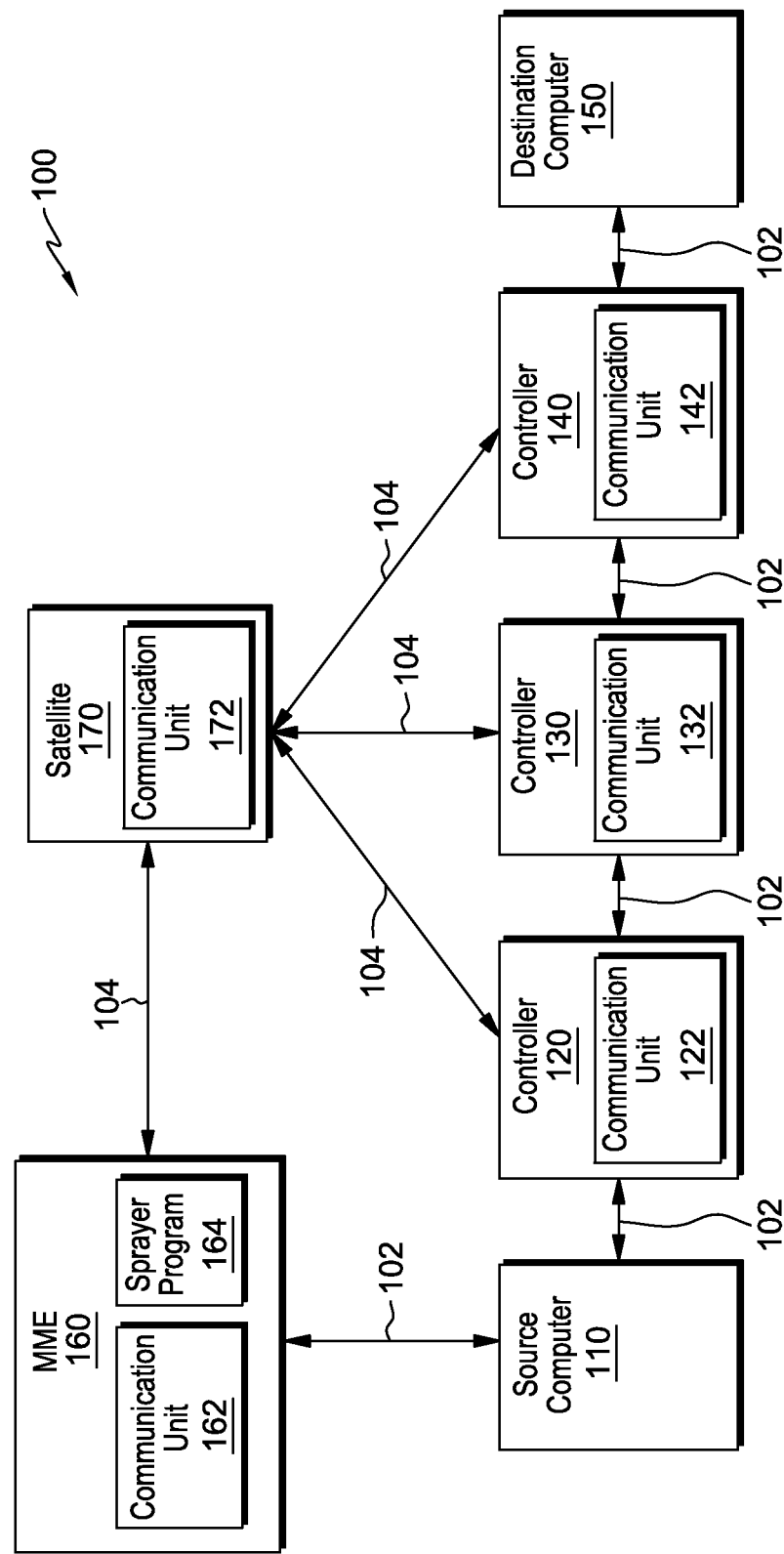
FIG. 1 is a functional block diagram of a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments can be implemented. Many modifications to the depicted embodiment can be made by those skilled in the art without departing from the scope of the invention as recited by the claims.

An embodiment of data processing environment 100 includes source computer 110, controller 120, controller 130, controller 140, destination computer 150, and MME 160 interconnected over network 102. Additionally, data processing environment 100 includes satellite 170 interconnected to MME 160 over network 104. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between source computer 110, controller 120, controller 130, controller 140, destination computer 150, MME 160, and any other computer connected to the network, in accordance with embodiments of the present invention. For example, network 102 can be a 2G, 3G, 4G, etc. network. Network 104 can be, for example, radio waves. In general, network 104 can be any combination of connections and protocols that will support communications between satellite 170 and MME 160, controller 120, controller 130, controller 140, and any other computer connected to the network, in accordance with embodiments of the present invention. For example, network 104 can include radio signals in the very high-frequency range of 1-50 gigahertz to transmit and receive signals with satellites.

In example embodiments, source computer 110 can be a laptop, tablet, or netbook personal computer (PC), a desktop computer, a personal digital assistant (PDA), a smart phone, or any programmable electronic device capable of communicating with any computing device within data processing environment 100. In certain embodiments, source computer 110 collectively represents a computer system utilizing clustered computers and components (e.g., database server computers, application server computers, etc.) that act as a single pool of seamless resources when accessed by elements of data processing environment 100, such as in a cloud computing environment. In general, source computer 110 is representative of any electronic device or combination of electronic devices capable of executing computer readable program instructions. Source computer 110 can include components as depicted and described in further detail with respect to FIG. 3, in accordance with embodiments of the present invention. Destination computer 150 is substantially similar to source computer 110.

In an embodiment, controller 120 manages and allocates resources (not shown) of network elements. For example, network elements can be a base transceiver station (BTS), radio base stations (RBS), Evolved Node B (eNodeB), a pocket data network gateway, a policy and sharing rules function, or any other network element capable of communicating with controller 120 through communication unit 122. In an embodiment, controller 120 can manage a single resource (e.g., a cell phone tower). In an alternative embodiment, controller 120 can manage multiple resources (e.g., a cellular system consisting of multiple cell phone towers). The resources are used as part of network 102 and are used to communicate data between devices (e.g., source computer 110 and destination computer 150). Controller 120 is equipped with communication unit 122. Communication unit 122 is a piece of hardware accessible to controller 120 that allows for communication between the controller and satellite 170, via a connection between communication unit 122 and communication unit 172. Communication unit 122 and communication unit 172 are devices that provide a method for allowing communication between a device and a satellite communication system (i.e., satellite 170). The interface can include a satellite modem, including an antenna, a communications link to communicate with the wireless communications device (i.e., a Wi-Fi link using voice-over IP) and an applications processor, with associated memory, to handle control and handshaking functions between communication unit 122 and communication unit 172 (i.e., the communications link, satellite modem, and related interfaced equipment) and to assist and reformat as needed transmissions of data between the communications units. Controller 120 can be a computer substantially similar to source computer 110. Controller 130 and controller 140 are substantially similar to controller 120. Communication unit 132 and communication unit 142 are substantially similar to communication unit 122.

In an embodiment, MME 160 provides system management for a network (e.g., an LTE network) and supports subscriber authentication, roaming and handovers to other networks (not shown). MME 160 is the control-node for the access-network and can be responsible for at least the following: (1) tracking and paging procedures for user equipment (UE) when they are in idle mode including retransmissions; (2) bearer activation/deactivation processes; (3) user authentication through interaction with the Home Subscriber Service (HSS); (4) selection of the Serving Gateway (SGW) and PDN Gateway (PGW); (5) replication of the user traffic for lawful interception applications; and (6) mobility and interaction between all networks (e.g., LTE, 2G, 3G, etc.). MME 160 is scalable in size to meet the capabilities and quality of serviced requirements of network 102. MME 160 includes communication unit 162 and sprayer program 164. MME 160 can be found on a computer substantially similar to source computer 110. Communication unit 162 is substantially similar to communication unit 122.

In an embodiment, sprayer program 164 notifies satellite 170 of the bearer channel. Sprayer program 164 imports the network layout including any controllers (i.e., controller 120, controller 130, and controller 140) and the network connections between the controllers (i.e., network 102). MME 160 receives a communication request (i.e., a transfer of data from source computer 110 to destination computer 150) and notifies sprayer program 164 of the bearer channel (i.e., the network that will transfer the data). Sprayer program 164 determines the satellite(s) (i.e., satellite 170) that can connect to the controllers in the bearer channel. Sprayer program 164 notifies the determined satellite(s) and the determined satellite(s) notify the controllers of the bearer channel. Sprayer program 164 notifies MME 160 that the data can then be transferred. In an alternative embodiment, the controllers will notify the satellite(s) if they are available to perform the data transfer request and the satellite(s) will notify sprayer program 164 and sprayer program will notify MME 160. Upon receiving confirmation that the controllers are available, sprayer program 164 will notify MME 160 that the data can then be transferred.

In an embodiment, satellite 170 is an artificial object that has been intentionally placed in orbit around the Earth for the purpose of telecommunications. For fixed (point-to-point) services, satellite 170 provides a microwave radio relay technology complementary to that of communication cables. Satellite 170 includes a communication payload (not shown) that is composed of at least a transponder, an antenna, and switching systems. In an alternative embodiment, satellite 170 is a self-contained system with an ability to receive signals from earth and retransmit those signals back to earth with the help of an integrated receiver and transmitter of radio signals. Satellite 170 includes communication unit 172, similar to communication unit 122, providing communication between the satellite and MME 160, controller 120, controller 130, and controller 140.

A user interface (not shown) is a program that provides an interface between a user and sprayer program 164. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

Figure 2:
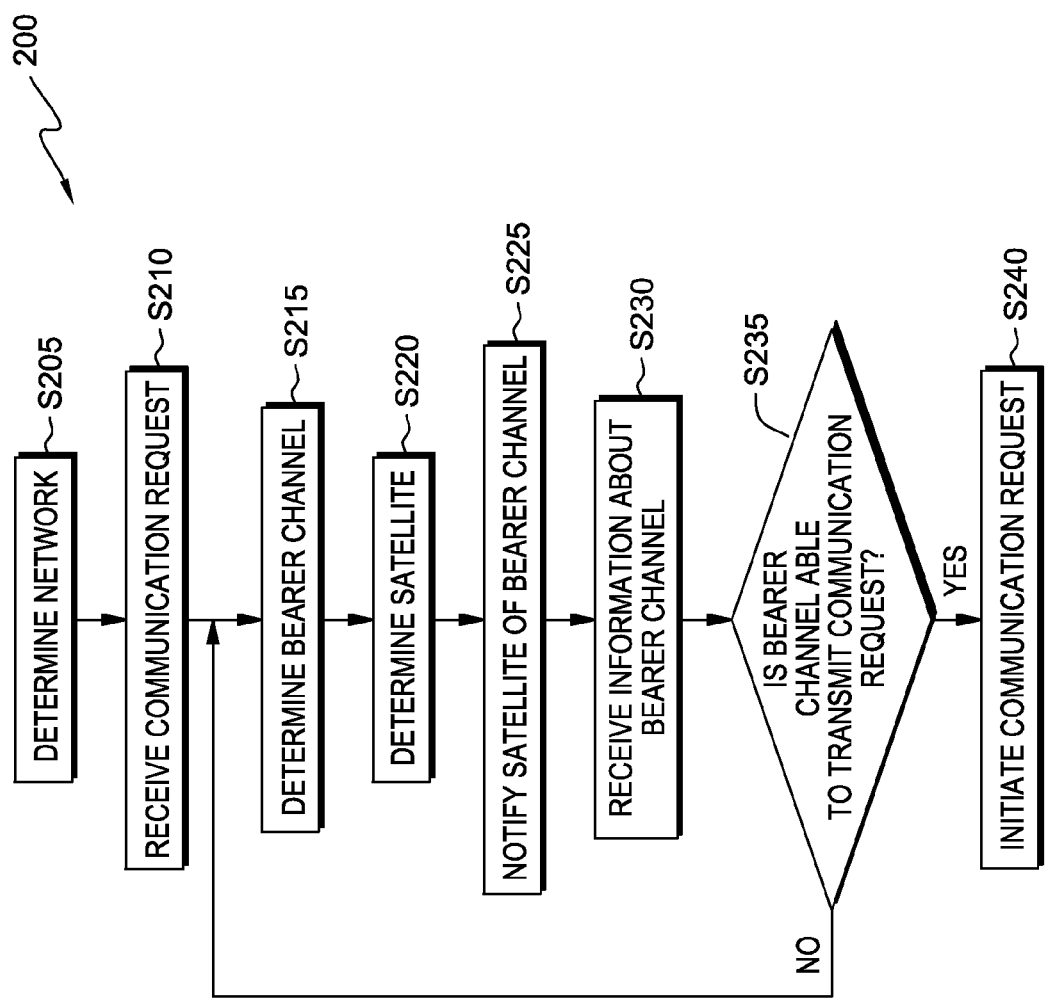
FIG. 2 is a flowchart depicting operational steps for parallel route reservation for wireless technologies, in accordance with an embodiment of the present invention.

FIG. 2 is a flowchart of workflow 200 depicting operational steps for parallel route reservation for wireless technologies, in accordance with an embodiment of the present invention. In one embodiment, the steps of the workflow are performed by sprayer program 164 or other programs (not shown) found on MME 160. Alternatively, steps of the workflow can be performed by any other program while working with sprayer program 164. In an embodiment, sprayer program can invoke workflow 200 upon receiving a request to communicate with a satellite. In an alternative embodiment, sprayer program can invoke workflow 200 upon determining a network or receiving a communication request. A user, via the user interface discussed previously, can change, edit or modify any steps of workflow 200.

Sprayer program 164 determines a network (step S205). In an embodiment, sprayer program 164 is notified of a network via a user input to the user interface, discussed previously. For example, a user notifies sprayer program 164 of the network depicted in data processing environment 100 including source computer 110, controller 120, controller 130, controller 140, and destination computer 150 all interconnected over network 102 and satellite 170 that can communicate with the network, discussed previously. Additionally, the information about the network includes information about which controllers are in each satellites footprint. For example, controller 120, controller 130, and controller 140 are in satellite 170's footprint because the satellite can communicate with them. Controller 120 can be in the footprint of multiple footprints of satellites (i.e., a satellite not shown in FIG. 1). In an alternative embodiment, sprayer program 164 can be notified of the network by MME 160. In yet another alternative embodiment, sprayer program 164 can be notified of multiple networks.

Sprayer program 164 receives a communication request (step S210). The communication request can be for the transfer of any form of data. The communication request can include a quality of service requirement, or all forms of communication from a user or program can be under a specific service level agreement that requires certain performance guarantees in transferring the data. In an embodiment, a user can indicate on source computer 110 via a user interface (not shown) that the user would like to transfer data from source computer 110 to destination computer 150 and this information is relayed to sprayer program 164. In an alternative embodiment, a user of MME 160, via user interface discussed previously, can indicate that the user would like to transfer data from source computer 110 to destination computer 150 and this information is relayed to sprayer program 164. In even yet another embodiment, a user of any computer (not shown) that is connected to MME 160 via network 102 can indicate to sprayer program 164 that the user would like to transfer data from source computer 110 to destination computer 150. In even yet another embodiment, sprayer program 164 can receive the communication request from another program (not shown) that is utilized for data transfers.

Sprayer program 164 determines the bearer channel (step S215). Based on the requirements of the data transfer (i.e., quality of service, service level agreement, type of data to be transferred, etc.), sprayer program 164 is notified of the resources of the network that are needed to transfer the data from source computer 110 to destination computer 150. In an embodiment, MME 160 or any program found on MME can determine the optimal bearer channel and notify sprayer program 164. In an alternative embodiment, the bearer channel to be used can be determined by another program not shown and not found on MME 160, and the information about which bearer channel to use can be sent to sprayer program 164 with the data transfer request.

Sprayer program 164 determines the satellite (step S220). Based on the bearer channel determined in the previous step, sprayer program 164 determines which satellite(s) have the footprints that cover the controllers in the bearer channel. For example, sprayer program 164 determines that bearer channel includes controller 120, controller 130, and controller 140. Therefore, sprayer program 164 determines that satellite 170, based on satellite 170's footprint, has a footprint that includes controller 120, controller 130, and controller 140, and therefore, satellite 170 would be a suitable and even optimal satellite to use. In an embodiment, sprayer program 164 can contact satellites to determine the controllers in the satellite's footprints. In an alternative embodiment, sprayer program 164 can analyze a list of controllers known to be found in the footprint of a satellite. In yet another embodiment, MME 160 or any other program found on MME can determine the optimal satellite(s). If an area is covered by multiple satellites, the optimal satellite is determined based on available bandwidth of the satellite or based upon the cost of using the satellite to relay the transfer requests. In another embodiment, multiple satellites may need to be requested when traveling through larger bearer channels (e.g., when the data is traveling from Asia to North America). In yet another embodiment, multiple satellites with the same footprint can be selected for redundancy purposes.

Sprayer program 164 notifies the satellite of the bearer channel (step S225). In other words, sprayer program 164 notifies the satellite(s) determined previously of the communication request and the controllers that the satellite(s) must communicate with. For example, for a communication request between source computer 110 and destination computer 150, sprayer program 164 notifies satellite 170, via communication unit 162 and communication unit 172, of controller 120, controller 130, and controller 140 being used for the communication request. Satellite 170 then notifies controller 120, controller 130, and controller 140 of the communication request. In an alternative embodiment, controller 120, controller 130, and controller 140 respond to satellite 170 about their availability to handle the communication request and sprayer program 164 receives this information from the satellite (step S230). In yet another embodiment, sprayer program 164 can indicate in the notification to the controllers that the controllers should reserve the network elements of the communication path for the communication request.

Sprayer program 164 determines if the bearer channel is able to transmit the communication request (decision block S235). In an embodiment, if sprayer program 164 has notified satellite 170 of the bearer channel and the communication request, and the satellite indicated to sprayer program that the satellite has contacted the controllers in the bearer channel, sprayer program determines that the bearer channel is able to transmit the communication request (decision block S235, yes branch) and then sprayer program initiates the communication request (step S240). If sprayer program 164 does not receive an indication from satellite 170 that the bearer channel has been notified (decision block S235, no branch), sprayer program determines a new bearer channel (step S215).

In an alternative embodiment, sprayer program 164 waits for a response from each element of the bearer channel (i.e., controller 120, controller 130, and controller 140) via satellite 170. If each controller indicates to sprayer program 164 via satellite 170 that they are able and ready to transmit the communication request (decision block S235, yes branch), then sprayer program initiates the communication request (step S240). If any of the controllers in the bearer channel indicate to sprayer program 164 that they are unable to transmit the communication request (decision block 5234, no branch), then sprayer program determines a new bearer channel (step S215).

Sprayer program 164 initiates the communication request (step S240). In other words, sprayer program 164 allows the communication request to occur. In an alternative embodiment, sprayer program 164 can indicate to MME 160, source computer 110, or any other device that controls the initiation of the communication request that the communication request can now be sent because the controllers are available to transmit the communication. For example, sprayer program 164 indicates to MME 160 that the communication request can be initiated. MME 160 can then initiate the communication request and send the data of the communication request from source computer 110 to destination computer 150 via the network 102 connection controller 120, controller 130, and controller 140.

Figure 3:
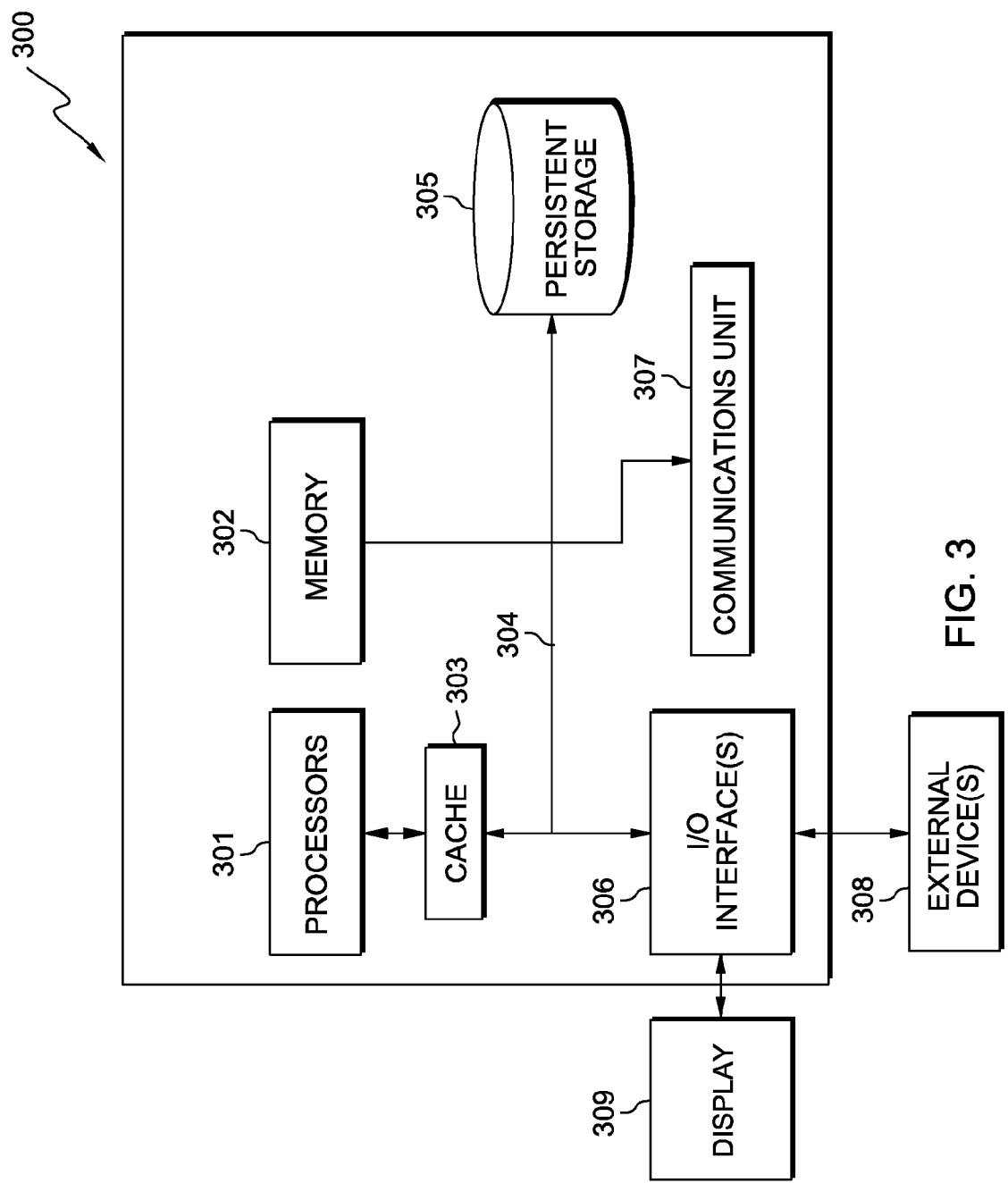
FIG. 3 depicts a block diagram of components of the computers of FIG. 1, in accordance with an embodiment of the present invention.

FIG. 3 depicts computer 300 which is representative of source computer 110, destination computer 150, and MME 160, which includes sprayer program 164. Computer 300 includes processors 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for parallel route reservation for wireless technologies, the method comprising the steps of:

receiving, by one or more computer processors, a communication request between a first computer and a second computer;

determining, by one or more computer processors, at least two network resources in a communication path between the first computer and the second computer;

identifying, by one or more computer processors, at least one satellite that is in communication with each of the at least two network resources in the communication path, wherein the identified at least one satellite notifies each of the at least two network resources in the communication path of the communication request, wherein the at least one satellite simultaneously notifies each of the at least two network resources used in the communication path that there is a communication request between the first computer and the second computer; and responsive to notifying the at least two network resources of the communication request, initiating, by one or more computer processors, the communication request between the first computer and the second computer.

2. The method of claim 1, wherein the at least two network resources are part of a cellular network.

3. The method of claim 1, wherein responsive to notifying the at least two network resources of the communication request, initiating, by one or more computer processors, the communication request between the first computer and the second computer comprises:
- receiving, by one or more computer processors, an indication from the at least one satellite that each of the at least two network resources of the communication path are available to complete the communication request; and
- responsive to notifying and receiving the indication, initiating, by one or more computer processors, the communication request between the first computer and the second computer.

4. The method of claim 1, wherein the at least two network resources are one or more of the following: a base transceiver station, a radio base station, a Evolved Node b, a pocket data network gateway, and a policy and sharing rules function.

5. The method of claim 1, wherein the communication path is determined based on one or more of the following: a quality of service requirement, a service level agreement, and a performance requirement.

6. The method of claim 1, wherein the step of identifying, by one or more computer processors, at least one satellite that is in communication with each of the at least two network resources in the communication path, wherein the identified at least one satellite notifies each of the at least two network resources in the communication path of the communication request comprises:
- identifying, by one or more computer processors, at least one satellite that is in communication with each of the at least two network resources in the communication path, wherein the identified at least one satellite notifying each of the at least two network resources in the communication path of the communication request and reserving the communication path for the communication request.

7. A computer program product for parallel route reservation for wireless technologies, the computer program product comprising:
- one or more computer readable storage media; and
- program instructions stored on the one or more computer readable storage media, the program instructions comprising:
  - program instructions to receive a communication request between a first computer and a second computer;
  - program instructions to determine at least two network resources in a communication path between the first computer and the second computer;
  - program instructions to identify at least one satellite that is in communication with each of the at least two network resources in the communication path, wherein the identified at least one satellite notifies each of the at least two network resources in the communication path of the communication request, wherein the at least one satellite simultaneously notifies each of the at least two network resources used in the communication path that there is a communication request between the first computer and the second computer; and
  - program instructions, responsive to notifying the at least two network resources of the communication request, to initiate the communication request between the first computer and the second computer.

8. The computer program product of claim 7, wherein the at least two network resources are part of a cellular network.

9. The computer program product of claim 7, wherein program instructions, in responsive to notifying the at least two network resources of the communication request, to initiate the communication request between the first computer and the second computer comprise:
- receive an indication from the at least one satellite that each of the at least two network resources of the communication path are available to complete the communication request; and
- responsive to notifying and receiving the indication, initiate the communication request between the first computer and the second computer.

10. The computer program product of claim 7, wherein the at least two network resources are one or more of the following: a base transceiver station, a radio base station, a Evolved Node b, a pocket data network gateway, and a policy and sharing rules function.

11. The computer program product of claim 7, wherein the communication path is determined based on one or more of the following: a quality of service requirement, a service level agreement, and a performance requirement.

12. The computer program product of claim 7, wherein the program instructions to identify at least one satellite that is in communication with each of the at least two network resources in the communication path, wherein the identified at least one satellite notifies each of the at least two network resources in the communication path of the communication request comprises:
- program instructions to identify at least one satellite that is in communication with each of the at least two network resources in the communication path, wherein the identified at least one satellite notifies each of the at least two network resources in the communication path of the communication request and reserves the communication path for the communication request.

13. A computer system for parallel route reservation for wireless technologies, the computer system comprising:
- one or more computer processors;
- one or more computer readable storage media; and
- program instructions stored on the one or more computer readable storage media for execution by at least one of the one or more computer processors, the program instructions comprising:
  - program instructions to receive a communication request between a first computer and a second computer;
  - program instructions to determine at least two network resources in a communication path between the first computer and the second computer;
  - program instructions to identify at least one satellite that is in communication with each of the at least two network resources in the communication path, wherein the identified at least one satellite notifies each of the at least two network resources in the communication path of the communication request, wherein the at least one satellite simultaneously notifies each of the at least two network resources used in the communication path that there is a communication request between the first computer and the second computer; and program instructions, responsive to notifying the at least two network resources of the communication request, to initiate the communication request between the first computer and the second computer.

14. The computer system of claim 13, wherein the at least two network resources are part of a cellular network.

15. The computer system of claim 13, wherein program instructions, in responsive to notifying the at least two network resources of the communication request, to initiate the communication request between the first computer and the second computer comprise:

receive an indication from the at least one satellite that each of the at least two network resources of the communication path are available to complete the communication request; and responsive to notifying and receiving the indication, initiate the communication request between the first computer and the second computer.

16. The computer system of claim 13, wherein the at least two network resources are one or more of the following: a base transceiver station, a radio base station, a Evolved Node b, a pocket data network gateway, and a policy and sharing rules function.

17. The computer system of claim 13, wherein the communication path is determined based on one or more of the following: a quality of service requirement, a service level agreement, and a performance requirement.

18. The computer system of claim 13, wherein the program instructions to identify at least one satellite that is in communication with each of the at least two network resources in the communication path, wherein the identified at least one satellite notifies each of the at least two network resources in the communication path of the communication request comprises:

program instructions to identify at least one satellite that is in communication with each of the at least two network resources in the communication path, wherein the identified at least one satellite notifies each of the at least two network resources in the communication path of the communication request and reserves the communication path for the communication request.

* * * * *